United States Patent
Smithwick et al.

(10) Patent No.: US 10,921,593 B2
(45) Date of Patent: Feb. 16, 2021

(54) COMPACT PERSPECTIVELY CORRECT OCCLUSION CAPABLE AUGMENTED REALITY DISPLAYS

(71) Applicant: Disney Enterprises, Inc., Burbank, CA (US)

(72) Inventors: Quinn Yorklun Jen Smithwick, Pasadena, CA (US); Isela D. Howlett, Tucson, AZ (US)

(73) Assignee: Disney Enterprises, Inc., Burbank, CA (US)

( * ) Notice: Subject to any disclaimer, the term of this patent is extended or adjusted under 35 U.S.C. 154(b) by 362 days.

(21) Appl. No.: 15/938,140

(22) Filed: Mar. 28, 2018

(65) Prior Publication Data

US 2018/0292655 A1    Oct. 11, 2018

Related U.S. Application Data

(60) Provisional application No. 62/482,533, filed on Apr. 6, 2017.

(51) Int. Cl.
*G02B 27/01* (2006.01)
*G06T 19/00* (2011.01)

(52) U.S. Cl.
CPC .......... *G02B 27/0172* (2013.01); *G06T 19/00* (2013.01); *G02B 2027/014* (2013.01); *G02B 2027/0118* (2013.01)

(58) Field of Classification Search
CPC ... G02B 27/01–0189; G02B 2027/0105–0198; G03B 21/00–64; H04N 9/31–3197
See application file for complete search history.

(56) References Cited

U.S. PATENT DOCUMENTS 5,831,712 A    11/1998  Tabata et al.
6,215,532 B1 *  4/2001  Takagi ............... G02B 27/0101
                                                 345/7

(Continued)

OTHER PUBLICATIONS

Ozan Cakmakci, Yonggang Ha and Jannick P Rolland, "A Compact Optical See-through Head-Worn Display with Occlusion Support," Conference Paper, Jan. 2004, 11 pages.

(Continued)

*Primary Examiner* — Christina A Riddle
*Assistant Examiner* — Christopher A Lamb, II
(74) *Attorney, Agent, or Firm* — Patterson + Sheridan, LLP

(57) ABSTRACT

Embodiments herein describe AR systems that provide occluded AR content to a user while maintaining the perspective of the user. In one embodiment, the AR system includes an optical cloak that contains a mask display device and an AR display device and one or more focusing elements and a prism for focusing light captured from the user's environment. As the light enters the optical cloak, the mask display device occludes a portion of the user's view to generate a black silhouette. The AR system then combines AR content displayed by the AR display device with the image of the environment such that the location of the AR content overlaps with the location of the black silhouette. Furthermore, the spacing and characteristics of the focusing elements and the prism are set to maintain the perspective of the user as the light passes through the optical cloak.

16 Claims, 10 Drawing Sheets

(56) References Cited

U.S. PATENT DOCUMENTS

| | | | |
|---|---|---|---|
| 7,379,247 B2 | 5/2008 | Goto | |
| 7,639,208 B1 * | 12/2009 | Ha | G02B 27/0172 345/204 |
| 8,913,591 B2 | 12/2014 | Bienas et al. | |
| 9,164,281 B2 | 10/2015 | Hing et al. | |
| 2011/0075257 A1 | 3/2011 | Hua et al. | |
| 2012/0313839 A1 | 12/2012 | Smithwick et al. | |
| 2013/0077140 A1 * | 3/2013 | Bach | G02B 17/04 359/15 |
| 2013/0208014 A1 | 8/2013 | Fleck et al. | |
| 2014/0112651 A1 | 4/2014 | Sato | |
| 2014/0177023 A1 | 6/2014 | Gao et al. | |
| 2016/0247319 A1 | 8/2016 | Nowatzyk et al. | |
| 2017/0185037 A1 | 6/2017 | Lee et al. | |
| 2017/0299866 A1 | 10/2017 | Smithwick | |
| 2017/0330376 A1 | 11/2017 | Haseltine | |

OTHER PUBLICATIONS

Swift, "Image Rotation Devices—A comparative survey", Optics Lasers and Technology, pp. 175-188,1972.

Kiyokawa et al_ "An Occlusion-Capable Optical See-through Head Mount Display for Supporting Co-located collaboration" 2003 IEEE, downloaded from <http://bdcampbell.net/articles/ISMARPaper. pdf>, pp. 1-9.

Kiyokawa et al_ "An optical see-through display for mutual occlusion with a real-time stereovision system" 2001 Elsevier Science Ltd, downloaded from <http://www-prima.inrialpes.fr/persoff Tran/Documents/Articles/J .Crowley/25 5.pdf>, pp. 1-15.

Kiyokaw et al. "ELMO: An Enhanced Optical See-Through Display Using an LCD Panel for Mutual Occulsion", town loaded from <http://lab.ime.cmc.osaka-u.ac.jp/-kiyo/cr/kiyokawa-2001-03-ISMR2001 /kiyokawa-2001-03- SMR2001 pdf> on Apr. 4, 2016, pp. 1-2.

Choi et al. "Paraxial ray optics cloaking", 2014 Optical Society of America, vol. 22, Issue 24, downloaded from 4 <https://www.osapublishing.org/oe/fulltext.cfm?uri=oe-22-24-29465&id=304785>, 14 pages.

Cakmakci et al. Design of a compact optical see-through head-worn display with mutual occlusion capability, :town loaded from <http://citeseerx.ist.psu.edu/viewdoc/download?doi= 10. 1_1 .63_8378 &rep=rep 1 &type=pdf>, 6 pages.

* cited by examiner

COMPACT PERSPECTIVELY CORRECT OCCLUSION CAPABLE AUGMENTED REALITY DISPLAYS

CROSS-REFERENCE TO RELATED APPLICATIONS

This application claims benefit of U.S. provisional patent application Ser. No. 62/482,533 filed Apr. 6, 2017 which is herein incorporated by reference in its entirety.

BACKGROUND

Field of the Invention

The embodiments herein are generally directed to providing occlusion and maintaining the perspective of the user when displaying augmented reality (AR) content.

Description of the Related Art

AR displays insert virtual content into real-world views of the user's environment. For example, a user may wear a headset that captures views of the real world and includes a lens and a display device that outputs the AR content. Using a beam-combiner, the headset combines the real-world image passing through the combiner with AR content viewed through the lens, so it appears in focus and at "infinity" (a far distance relative to the headset) before reaching the eye of the user. Thus, the user sees the AR content integrated into the real-world image. However, the appearance of the AR content is typically semi-transparent and cannot occlude the background since the light outputted by the display device combines with the light of the real-world image. Moreover, the AR content cannot display the color black since black is the absence of light, and thus, cannot be emitted by the display device. Put differently, if the any part of the AR content is black, when combined with the real-world image, the user will see only the real-world image at the portions of the AR content that should be black. Thus, occlusion and high-contrast AR content is important for visually integrating AR content and real-world imagery.

To improve the appearance of the AR content, some AR displays first occlude a portion of the real-world image before combining the real-world image and the AR content. In this case, the AR display uses a lens to focus the real-world onto a plane and also includes a first display through which the real-world image passes. While most of the first display is transmissive, a portion of the first display is opaque thereby creating a black silhouette that occludes a portion of the real-world image. Later, using second display, the AR content is combined to appear in the same location of the black silhouette overlaying the real-world image. For example, if the AR content is a cartoon character, the AR display controls the first display to generate an opaque portion with the same outline as the cartoon character. Because the AR content is combined with the real-world image at the location of the black silhouette, the appearance of the AR content is more vibrant, high-contrast and can include black. The AR content and silhouette are viewed through a second lens to appear at "infinity." However, this technique suffers from drawbacks such as inverting the real-world image and moving the perspective of the user to a point in front of the AR display.

SUMMARY

One embodiment described herein is an AR system that includes a first focusing element configured to receive light defining a view of a user environment, a mask display screen configured to occlude a selected portion of the view, an AR display screen configured to generate AR content that appears in the view at a location of the occluded selected portion, a prism where the light passes through the prism, and a second focusing element configured to emit the view containing the AR content to a user. Moreover, an optical path length of the prism and a spacing between the first and second focusing elements is set such that when the received light defining the view exits the AR system, the exiting light propagates in respective first directions that are the same as respective second directions of the received light entering the AR system such that the AR system is perspective correct.

Another embodiment described herein is an AR system that includes a first focusing element configured to receive light defining a view of a user environment, a mask display screen configured to occlude a selected portion of the view, an AR display screen configured to generate AR content that appears in the view at a location of the occluded selected portion, a prism where the light passes through the prism, and a second focusing element configured to emit the view containing the AR content to a user. Moreover, an optical path length of the prism and a spacing between the first and second focusing elements is set such that, to the perspective of the user, the first and second focusing elements and the prism do not redirect the light received from the user environment as the light travels through the AR system. The AR system further includes a field lens group collocated at focal planes of the first and second focusing elements.

Another embodiment described herein is a method that includes receiving light defining a view of a user environment at a first focusing element in an AR system, passing the light received at the first focusing element through a prism, occluding a selected portion of the view to produce a silhouette of AR content in the view, introducing the AR content into the view at a location of the silhouette, and outputting the view containing the AR content at a second focusing element. Moreover, an optical path length of the prism and a spacing between the first and second focusing elements is set such that when the light defining the view exits the AR system, the exiting light propagates in respective first directions that are the same as respective second directions of the light when entering the AR system.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Embodiments herein describe AR systems that provide occluded AR content to a user while maintaining the perspective of the user. In one embodiment, the AR system includes an optical cloak that contains a mask display device and an AR display device and one or more focusing elements (e.g., lenses or curved mirrors) for focusing light captured from the user's environment. As the light enters the optical cloak, the mask display device occludes a portion of the user's view to generate a black silhouette. The AR system then combines AR content displayed by the AR display device with the image of the environment such that the location of the AR content overlaps with the location of the black silhouette, thereby improving the quality of the AR content relative to combining the content with a non-occluded portion of light entering from the environment.

As described in "An Occlusion-capable Augmented Reality Head Mounted Display (AR-HMD) using Cloaking Optics" Ser. No. 15/099,412 filed on Apr. 14, 2016 which is incorporated by reference in its entirety, in order to maintain the user's perspective as the light passes through the optical cloak, the characteristics of the lenses used in the optical cloak (e.g., their focal length) as well as the spacing between the lenses may be determined using a mathematical model of the optical system by representing each optical element (e.g., the lenses) and the spacing between the elements using matrices which describe how the height and direction of light rays change as the rays pass through the optical elements. However, using the lenses alone to form the matrices and the optical clock can result in large AR systems that may have a center of mass further away from the face of the person wearing the system. To reduce the size of the AR system and to potentially move the center of mass closer to the person wearing the system, the embodiment herein use a combination of a prism with two or more lenses which can shrink the physical dimensions of the AR system. That is, the characteristics of the prism as well as the characteristics of the lenses used in the optical clock can be determined using the mathematical model by representing each optical element (e.g., both the lenses and the prism) and the spacing between the elements using the matrices. The resulting matrices are equated to a predefined matrix representing light simply passing through the empty space along the length of the AR system. The results from this calculation indicate the type of lenses and the prism (and their spacing therebetween) required to achieve an AR system whose output is the same as if the light passed through empty space, thereby maintaining the user's perspective. The locations of occluding masks and image displays are also provided by the calculations.

Figure 1:
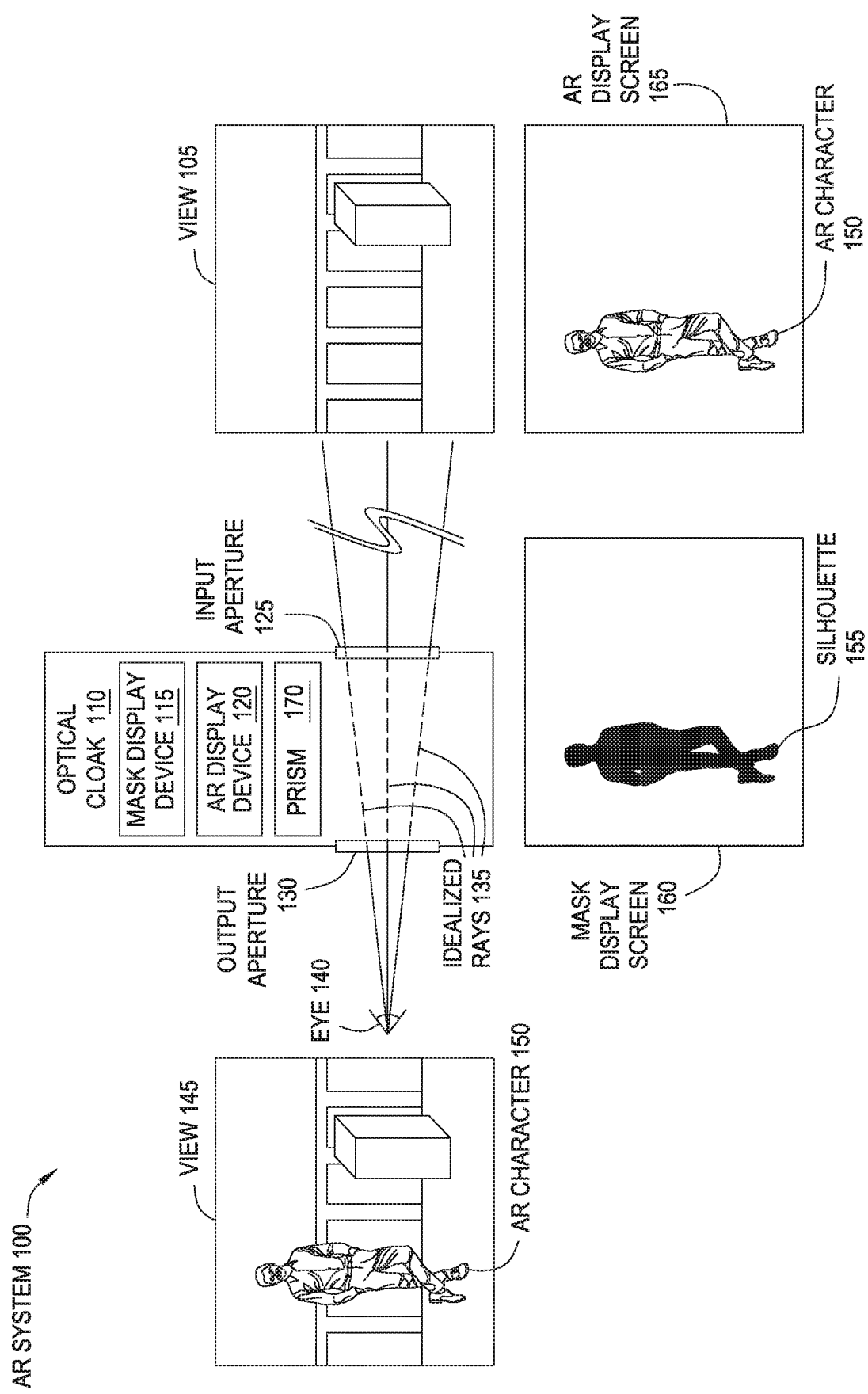
FIG. 1 is a block diagram of an AR system for maintaining the perspective of the user using an optical cloak, according to one embodiment described herein.

FIG. 1 is a block diagram of an AR system 100 for maintaining the perspective of the user using an optical cloak 110, according to one embodiment described herein. In one embodiment, the optical cloak 110 may be contained in a headset or other apparatus which is worn by the user. The optical cloak 110 includes an input aperture 125 (e.g., a focusing element) that captures light from the user's environment and an output aperture 130 aligned with an eye 140 of the user. FIG. 1 illustrates a view 105 of the environment at one particular point in time. Put differently, the view 105 (also referred to as the environmental view) is made up of the light that reflects off of objects (or is emitted by objects) in the environment that passes through the aperture 125 at a particular instant of time.

Although not shown in FIG. 1, the optical cloak 110 may include different optical elements (e.g., internal lenses, mirrors, and at least one prism 170) which deflect or alter the light entering the optical cloak 110 via input aperture 125. However, as described in more detail below, the light exiting the optical cloak 110 via output aperture 130 (which is the prism 170 in some embodiments but a lens or a mirror in other embodiments) maintains the perspective of the user. This is illustrated by the idealized rays 135 which traverse through the optical cloak 110 and form straight lines with the light rays entering and exiting the optical cloak 110. Thus, to the perspective of the user, the light exiting optical cloak 110 propagates in the same direction as if the light passed through empty space. Put differently, to the user's perspective, it is as if the optical cloak 110 does not redirect or change the direction of the light in any way as the light travels between the objects in the environment and the user. Although the idealized rays 135 are shown for a single viewpoint from eye 140, the optical cloak provides a perspective correct view for any eye location or viewpoint, and for rays originating from any distance from the optical cloak 110. Even though the optical cloak 110 appears to the user as not redirecting or changing the direction of the light, as discussed below, the optical cloak 110 includes multiple optical elements that redirect the direction of the light that traverses therethrough.

To insert AR content into the view 105 of the environment, the optical cloak 110 includes a mask display device 115 and an AR display device 120. As the received light passes through the mask display device 115, the display 115 occludes a portion of the light. In one example, the mask display 115 occludes a portion of the view 105 by absorbing or deflecting away the light in a selected location or area of the view 105. This is shown by a mask display screen 160 in FIG. 1 where a portion of the screen 160 includes a black silhouette 155 while the remaining portion of the screen 160 is transparent. In one embodiment, the mask display device 115 is a liquid crystal display (LCD) panel that does not have a back light. The optical cloak 110 includes logic for controlling the LCD panel such that a portion of the screen 160 blocks or occludes the light received from the environment while the other portion permits the light to pass substantially unabated (i.e., with only minor or no attenuation) through the screen 160. As such, after passing through the mask display screen 160, the resulting image is the same as view 105 except for a blacked out portion corresponding to the location of the silhouette 155 in the mask display screen 160.

In one embodiment, the received light then reaches a beam combiner that permits the AR content displayed on the AR display screen 165 to be injected into (or combined with) the light from the environmental view 105. The logic in the optical cloak 110 displays the AR content in a location of an AR display screen 165 such that the AR content corresponds to the same location as the silhouette 155. Put differently, when the AR content displayed in the screen 165 is combined with the image passing through the cloak, the AR content overlaps the silhouette 155 introduced into the image by the mask display screen 160, making the AR content appear opaque. Without the mask display device 115, the AR content would be combined with light received from the environment (which is not controlled by the optical cloak) which may change the illumination and appearance of the AR content in undesired ways (e.g., semi-transparent with low contrast).

Furthermore, if the AR content contains black shaded imagery, these portions of the AR content are replaced by whatever light is received from the environment. For example, if the AR character 150 was wearing black boots, then without the mask display device 115, instead of seeing black boots, the eye 140 would only see the color and shape of whatever object is in the view 105 at the location of the boots. However, because the silhouette 155 introduces a black object into the view 105 at the same location as the AR character 150, the AR content can include the shade of black. For example, if the AR character 150 is supposed to have black boots, then the AR display screen 165 simply does not output any light at the location of the boots in the character 150, thereby permitting this portion of the black silhouette 155 to be seen by the user. In contrast, wherever light and color is desired, the screen 165 outputs light and color which replace the black silhouette 155. As such, unlike the mask display screen 160, the AR display screen 165 does include a light source (e.g., a backlight in an LCD panel) that enables the screen 165 to output light and color to illuminate the AR character 150. The portion of the screen 165 that does not include the AR character 150 can be black in order to not introduce any additional light into the view 105.

The result of combining the silhouette 155 generated by the mask display device 115, the AR character 150 displayed by the AR display device 120, and the view 105 is shown in view 145. In this example, view 145 is one example of an image generated by the light exited the optical cloak 110 via output aperture 130 after being altered by the mask and AR display devices 115 and 120. As shown, view 145 is exactly the same as view 105 except the AR character 150 has been added. Again, if the AR character 150 has any black, this color is generated by the black silhouette 155. However, if the AR character 150 includes no black at all, then none of the black silhouette 155 would be visible to the user.

Although not discussed in detail here, logic in the optical cloak 110 synchronizes the mask and AR display devices 115 and 120 in order to ensure the black silhouette 155 is formed in the mask display screen 160 at a location that corresponds to a location where the AR character 150 is introduced into the view 105. Moreover, the logic can dynamically control the mask display device 115 and the AR display device 120 to insert animated AR content into the view 145. In order to move the character 150 in the environment, the logic synchronously moves the location of the silhouette 155 in the screen 160 and the location of the character 150 in screen 165 such that the AR character 150 continues to overlap the silhouette 155. In this manner, the advantages of displaying AR content in an occluded portion of the environmental view 105 can be maintained as the AR content moves in the view 145.

Furthermore, the AR system 100 may include an object recognition system such as LiDAR or depth cameras for identifying the location of objects in the environment. For example, the object tracking system may identify the box shown in view 105 which permits the optical cloak 110 to illustrate the AR character 150 interacting with the box such as jumping on top of the box. Also, the object recognition system may permit the optical cloak 110 to simulate a depth of the AR character 150 within the view 145. For example, the cloak 110 may make it appear to the user as if the AR character 150 is standing behind the box by only displaying a top half of the character 150 that is above the topmost surface of the box. With the dual layer AR display and/or mask, the depth camera may also place the character in depth by computing the appropriate blending of pixels between the two display layers.

Figure 2:
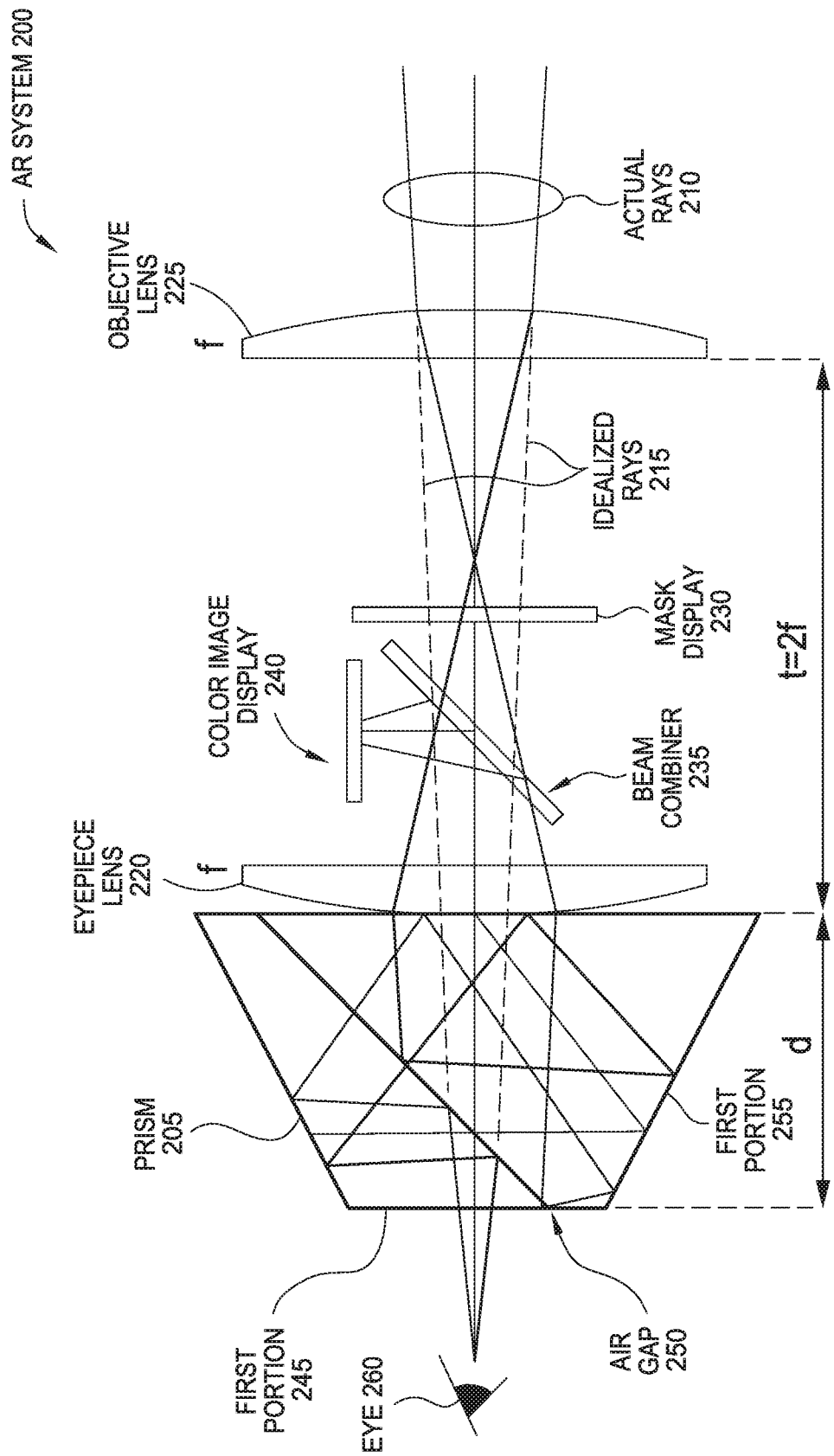
FIG. 2 is a perspective correct inline AR system with a prism, according to one embodiment described herein.

FIG. 2 is a perspective correct inline AR system 200 with a prism 205, according to one embodiment described herein. The optical cloaking constraint for this AR system 200 is the inline erecting prism 205 with normalized optical path length (OPL). The prism 205 is followed by two lenses, i.e., an eyepiece lens 220 and an objective lens 225 of equal focal lengths f. The lenses 220 and 225 are separated by a distance t that is equal to 2f (i.e., twice the focal length of the two lenses 220 and 225). By using lenses with the same focal length f, the AR system 200 does not magnify or shrink the view of the outside world as captured by the objective lens 225.

Moreover, a color image display 240, beam combiner 235, and a mask display 230 are disposed between the eyepiece lens 220 and the objective lens 225. As discussed above, the mask display 230 (e.g., a mask display device 115 or spatial light modulator (SLM)) blocks or occludes the light received from the environment while the other portion permits the light to pass substantially unabated. As such, after passing through the mask display 230, the resulting image is the same as the view of the outside world as seen by the objective lens 225 except for a blacked out portion corresponding to the location of a silhouette in the mask display 230. In contrast, the color image display 240 (e.g., an image SLM) outputs a color image (e.g., the AR character 150 shown in FIG. 1) that fills the silhouette introduced by the mask display 230. The beam combiner 235 combines the light passing through the mask display 230 with the light emitted by the color image display 240 to result in the AR character being inserted into the occluded portion of the view of the outside world.

The prism 205 erects the image passing through the eyepiece lens 220 and can replace a relay set of lenses, which may lead to more compact AR systems. The perspective correct AR system 200 is designed using ray transfer analysis or optical ray tracing to determine the focal lengths and spacing of the lenses that meet the cloaking constraint and thus perspective correct condition where light rays exit the AR system in the same direction as when the light rays entered the AR system, and exit at the height as if the rays traversed the system in a straight line. The "perspective correct condition" is that the views through the AR system maintain the correct orientation, size (1:1 magnification), and location/depth of real-world objects as a "naked-eye" view. In one embodiment, occlusion, parallax, and accommodation (focus) cues are also preserved. This analysis also takes into account the OPL of the prism 205.

FIG. 2 illustrates the inline embodiment where the appropriate ray traces are shown. The dotted lines illustrate the idealized rays 215 which indicate that although the optical components in the AR system 200 alter the image as shown by the actual rays 210, the user's perspective is not changed by the AR system 200.

In FIG. 2, the prism 205 is a Pechan-Schmidt prism that includes a first portion 245, a second portion 255, and an air gap 250 that separates the two portions. In one embodiment, the first portion 245 is made from a material that is different from the second portion 255. In one embodiment, the first and second portions 245 and 255 function as two separate prisms which work together to invert and revert a received image. After passing through the objective lens 225 and the eyepiece lens 220, the image may be flipped in both axes, or rotated 180 degrees. By reflecting the light through the OPL that includes the first and second portions 245 and 255, the image is reverted and inverted or flipped back to its original orientation before reaching the eye 260. This avoids having to add two different lenses which may increase the size relative to using the prism 205. Although a Pechan-Schmidt prism 205 is shown, any prism that reverts and inverts an image (or rotates an image by 180°) can be used such as, e.g., a Dove-Harting prism array. The Dove-Harting prism array allows for a wider field of view than the Pechan-Schmidt prism, but with a slight offset visible when moving between elements in the array. The Dove Harting prism has two orthogonally oriented dove prisms in series with each other, to invert and revert the image. To increase the view, the Dove Harting prism can be used in an array (just as a Dove prism is sometimes used in a Double Dove prism, where the reflecting surfaces of two Dove prisms are in contact). The Dove-Harting prism array has two orthogonal double dove prisms.

The characteristics (e.g., focal length, diameter, OPL etc.) and spacing of the lenses 220 and 225 and the prism 205 in the AR system 200 are selected in order to maintain the user's perspective as the light traverses through the system 200. To do so, a mathematical model of the optical system is constructed by representing each of the lenses and the prism in the cloak and their spacing relative to each other using matrices which describe how the height and direction of light rays change as they pass through the lenses and prism.

These matrices are parameterized by the focal length of the lenses, the OPL of the prism, and the distances between them. The resulting matrix product is equated to a predefined matrix representing light passing through empty space over the length of the AR system 200. Solving this equation provides the necessary characteristics of the lenses, prism, and their spacing in order to output light as if the light passed through empty space.

In one embodiment, the characteristics and spacing of the lenses and the prism may be determined using a Rochester cloaking technique which bends light through the center of the device but maintains the perspective of the user. The publication "Paraxial ray optics cloaking," Joseph S. Choi and John C. Howell, Opt. Express 22, 29465-29478 (2014) (incorporated herein by reference) describes using ABCD matrices so that objects between two lenses can be hidden from view. However, instead of using this technique for hiding objects between lenses, the embodiments herein may use this technique for maintaining the perspective of the user while inserting occluded-AR content into the environmental view captured by the objective lens 225.

Figure 3:
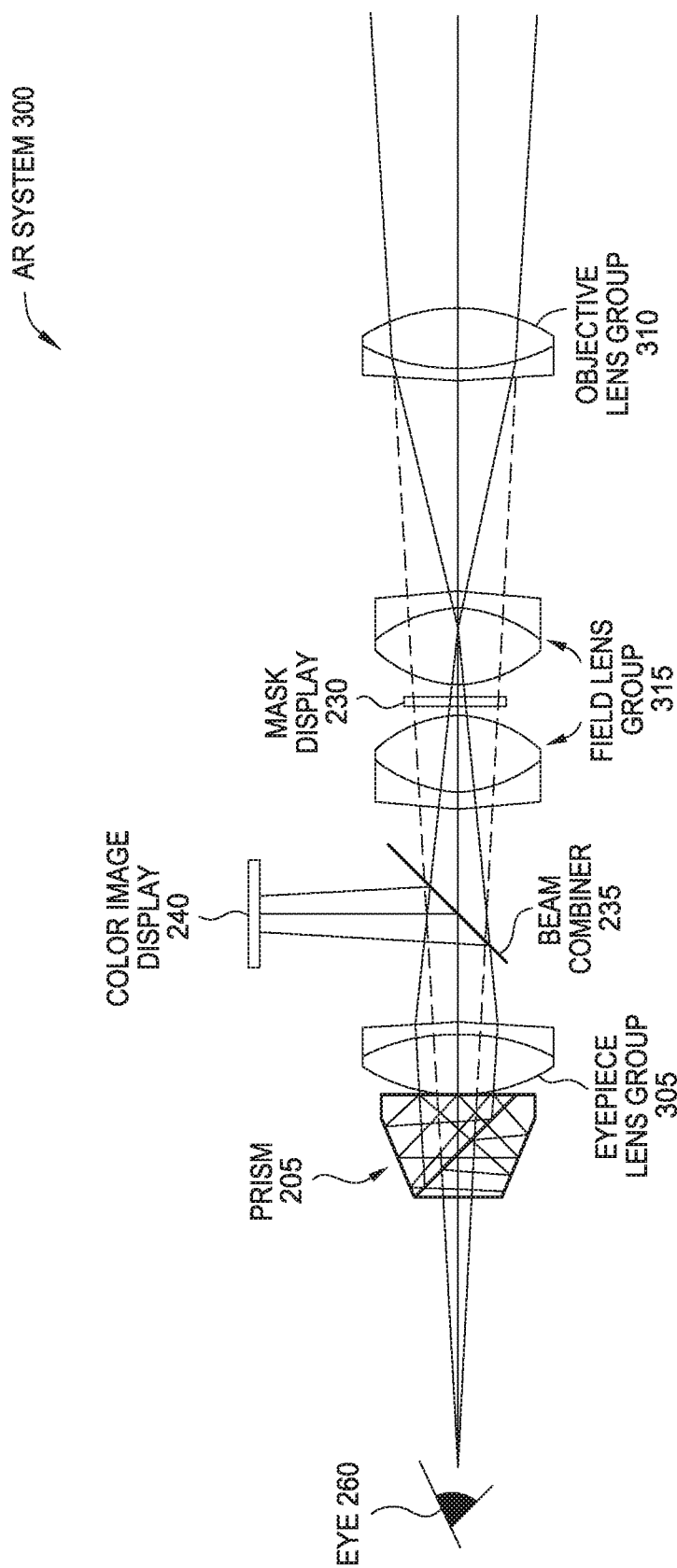
FIG. 3 is a perspective correct inline AR system with a prism, according to one embodiment described herein.

FIG. 3 is a perspective correct inline AR system 300 with the prism 205, according to one embodiment described herein. The AR system 300 includes many of the same components as the AR system 200 in FIG. 2 such as the prism 205, beam combiner 235, color image display 240 and the mask display 230 which perform the same function in the AR system 300. However, instead of single lenses, the AR system 300 includes an eyepiece lens group 305 and an objective lens group 310. Although the eyepiece lens group 305 and the objective lens group 310 can include only one lens, in other embodiments, these groups can each include multiple lenses. That is, each of these lens groups may be further split into multiple lenses, mirrors or optical surfaces to achieve or meet optical constraints (e.g. focal length, diameter, etc.) or improve performance and reduce aberrations.

The AR system 300 also include a field lens group 315 in which is disposed the mask display 230. One advantage of adding a third lens (e.g., a field lens) is that doing so increases the field of view relative to the AR system 200. In the AR system 200, the spacing and focal lengths of the eyepiece lens 220 and the objective lens 225 are defined by the OPL of the prism 205. However, adding a field lens (or the field lens group 315) provides additional flexibility such as providing more freedom to change the focal lengths of the eyepiece lens group 305 and the objective lens group 310 and results in a less constrained AR system 300.

However, because the field lens may operate best when located at the focal point of the objective lens group 310, this conflicts with the desired location of the mask display 230. In FIG. 3, the field lens group 315 includes two separate lenses which are disposed on either side of the mask display 230. The field lens group 315 is equivalent to a single lens disposed at the focal point. This frees up the location at the focal point for the mask display 230. In one embodiment, the focal length of the field lens group 315 is equal to $(f\_1^2)/(4f\_1-(OPL-1)t)$ where f_1 is the focal length of the eyepiece lens group 305 and the objective lens group 310, OPL is the OPL of the prism 205, and t is the distance between the eyepiece lens group 305 and the objective lens group 310.

The three-lens inline AR system 300 can meet the cloaking constraint and be perspective correct, with the focal length of the field lens group 315 providing an extra degree of freedom for more flexible designs. The prism 205 erects the image and removes a relay set resulting in a compact system as described above.

Figure 4:
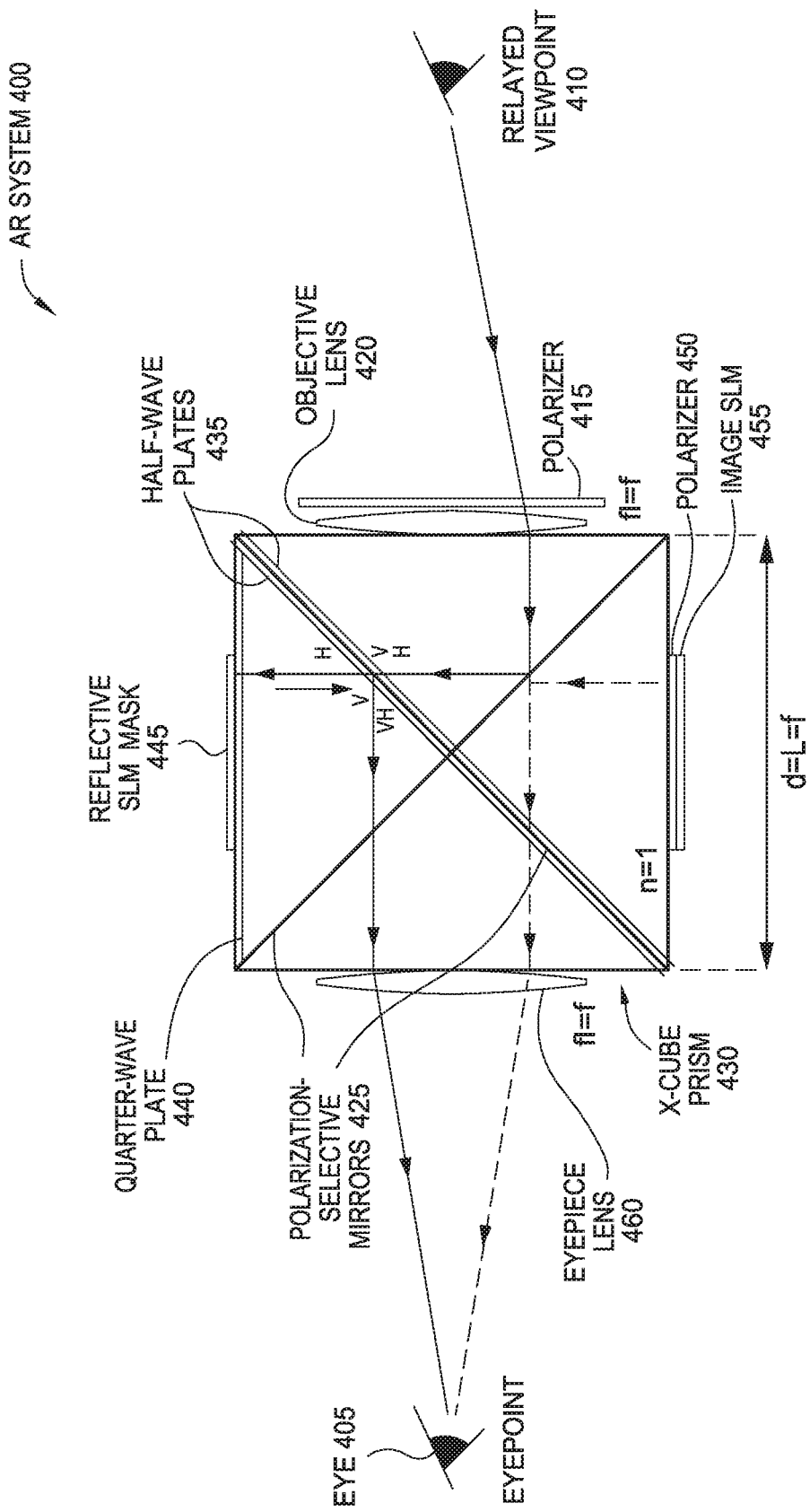
FIG. 4 is a non-perspective correct x-cube prism AR system, according to one embodiment described herein.

FIG. 4 is a non-perspective correct x-cube prism AR system 400, according to one embodiment described herein. As described below, the arrangement of an X-prism 430 with an objective lens and a eyepiece lens 460 as shown in FIG. 4 moves the perspective of the user from the location of the eye 405 to a relayed viewpoint 410. As such, objects appear closer to the user than they actually are.

The x-cube prism 430 (also referred to as an x-prism or a polarization selective block rotator) includes two polarization selective mirrors 425 extending between the corners of the prism 430. In this configuration, the mirrors 425 reflect horizontally polarized light, and pass vertically polarized light. Moving from right (i.e., the view of the environment) to left (i.e., the location of the user's eye 405), the light received from the environment (shown as the solid line) passes through a polarizer 415 to polarize the light (e.g., horizontal polarization). The rightmost lens (e.g., the objective lens 420) collimates the light onto the polarization selective mirror 425 extending from the lower right corner to the upper left corner of the x-prism 430 which reflects the horizontally polarized light up through the first half-wave plate 435 (which is disposed on the polarization selective mirror 425 extending from the lower left corner to the upper right corner of the x-prism 430), becoming vertically polarized and passing through the polarization selective mirror 425 extending from the lower left corner to the upper right corner of the x-prism 430. The light then passes through the second half-wave plate 435 (on the opposite side of the polarization selective mirror 425 extending from the lower left corner to the upper right) becoming horizontally polarized. The horizontally polarized light impinges on a reflective mask SLM 445. The reflective mask SLM 445 can be a liquid crystal on silicon (LCOS) device, which acts as a programmable quarter wave plate in front of a mirror. Upon reflection (and double passing the LCOS phase modulator), if the LCOS device's pixel is in the "on" state, the light's polarization is rotated to vertical polarization; if the pixel is in the "off" state, the light's polarization is not rotated and remains horizontally polarized. Although the reflective mask SLM 445 may be an LCOS device (which modulates the phase of the light), a reflective mirror digital micro-mirror device (DMD) (which deflects or does not deflect the light) with a bias prism (to align the optical axis with the DMD's mirrors offset angle in their on state), or an absorptive/blocking display (e.g. electrowetting, MEMS shutter) in front of a mirror. In these alternative cases, a quarter wave plate 440 is added in front of the modulator. The quarter wave plate 440 turns the horizontal polarized light to right circularly polarized light, then the right circularly polarized light reflects off of the DMD or mirror to become left circularly polarized and passes through the quarter wave plate 440 again to become vertically polarized. However, when using the LCOS, the quarter wave-plate 440 can be omitted because the LCOS can modulate the polarization of the light.

After reflection from (and modulation by) the reflective mask SLM 445, the vertically polarized light from the unmasked "on" pixels passes through the second half-wave plate 435 becoming horizontally polarized, reflects off the polarization selective mirror 425 extending from the lower left corner to the upper right corner of the x-prism 430 and then passes again through the second half-wave plate 435 to become vertically polarized. The light then passes through the polarization selective mirror 425 extending from the lower right corner to the upper left corner of the x-prism 430 substantially unabated and the collimated light is then focused by the eyepiece lens 460.

Masked "off" pixels are either blocked, deflected, or absorbed and do not travel past the reflective mask SLM 445, or are horizontally polarized and retrace the path back to the initial polarizer 415 and are absorbed (i.e. they travel through the second half-wave plate 435 to become vertically polarized, pass through the polarization selective material, pass through the first half-wave plate 435 to become horizontally polarized, reflect off the other polarization selective mirror 425 extending from the lower right corner to the upper left corner, and are absorbed by the polarizer 415).

To add a color image to the occluded image, the AR system 300 includes an image SLM 455 (e.g., a color display) at the bottom of the x-prism 430. A bottom polarizer 450 causes the light emitted by the image SLM 455 (shown as a dotted line) to be horizontally polarized. This image is reflected by the polarization selective mirror 425 extending from upper left to the lower right corner, and passes through the polarization selective mirror 425 (and the first and second half-wave plates 435) extending from the opposite corners, and is focused by the eyepiece lens 460). The color image replaces the occluded portion of the image received from the reflective mask SLM 445.

The folded two-lens system with an x-cube prism 430 in FIG. 4 does not satisfy the cloaking constraint and is not perspective correct. The system relays the viewpoint of the eye 405 to the opposite side of the system as shown by the related viewpoint 410, and that position changes with eye location. Objects will appear closer than they actually are, and as the viewer moves his/her head, the scene's parallax is incorrect. These issues may cause problems with navigation and manipulation of physical objects. The system 400 is also designed for a particular distance of physical objects. It may be desired that the AR system should work for all eye reliefs and viewing objects at all distances.

Figure 5:
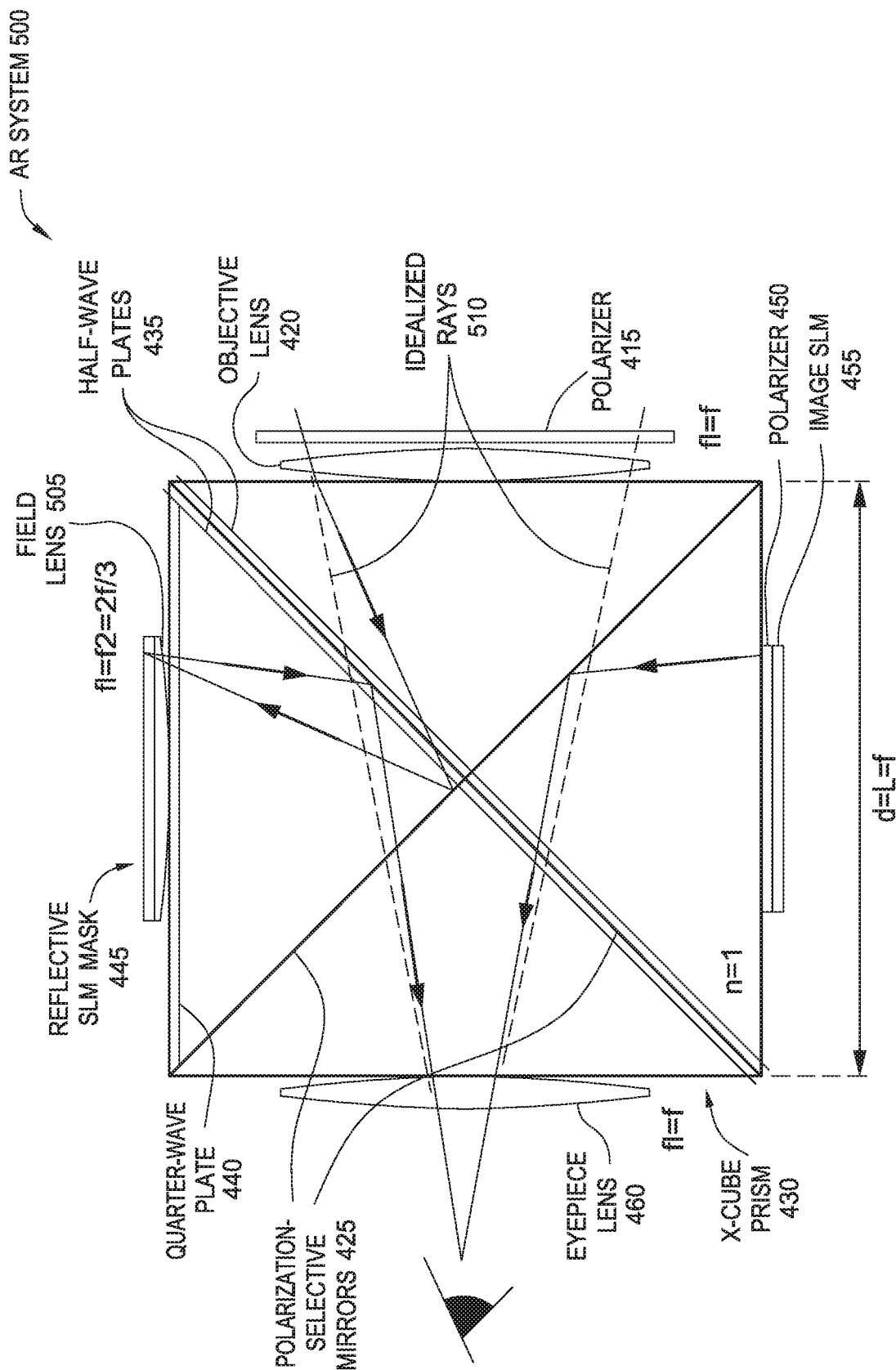
FIG. 5 is a perspective correct x-cube prism AR system, according to one embodiment described herein.

FIG. 5 is a perspective correct x-cube prism AR system 500, according to one embodiment described herein. The AR system 500 has many of the same components as the AR system (which is illustrated by reusing the same reference numbers). However, the AR system 500 includes a field lens 505 which is disposed between a top side of the x-cube prism 430 and the reflective mask SLM 445.

The three-lens system 500 with the x-cube erector prism 430 shown in FIG. 5 can produce a perspective correct occlusion capable system. This system 500 has two lens groups (i.e., the eyepiece lens 460 and the objective lens 420) each of focal length f with an x-cube prism 430 with an index of refraction n, depth d, and folded path length 2L, between the lenses. In one embodiment, the x-cube prism 430 acts as both an erector and fold mirrors. The field lens group can include a single field lens 505 as shown here or multiple field lenses which have a focal length equal to ⅔ of the focal length f of the eyepiece lens 460 and the objective lens 420. The reflective mask SLM 445 is disposed at the focal plane of the eyepiece lens 460 and the objective lens 420. In this manner, the AR system 400 can be modified as shown in the AR system 500 to be perspective correct as illustrated by the idealized rays 510.

As shown, the reflective mask SLM 445 faces a first side of the x-prism 430 (e.g., the top side) while the objective lens 420 faces a second side of the x-prism 430 and the eyepiece lens 460 faces a third side of the x-prism 430. The first side is perpendicular to the second and third sides.

Figure 6:
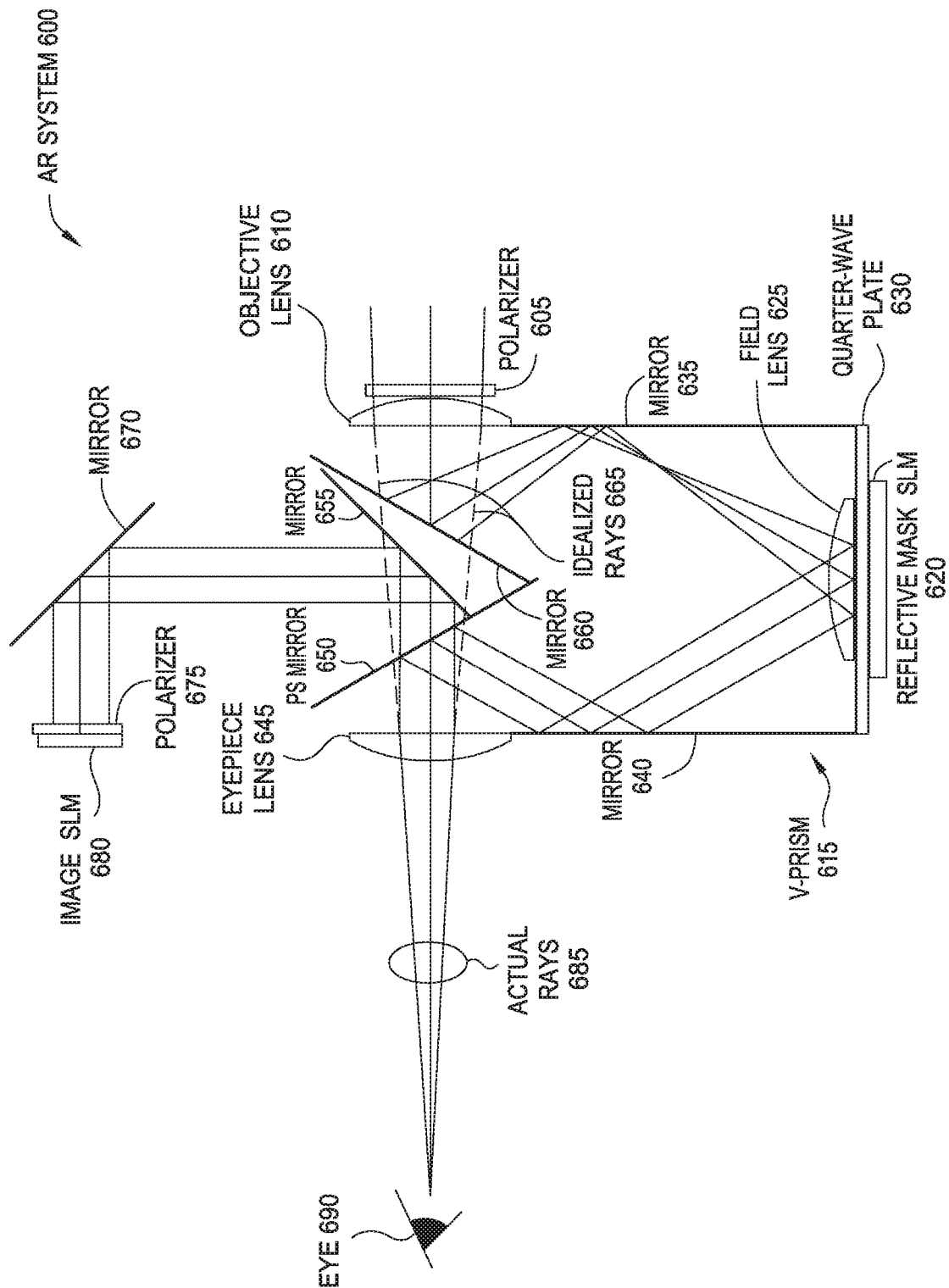
FIG. 6 is a perspective correct AR system with V-prism, according to one embodiment described herein.

FIG. 6 is a perspective correct AR system 600 with a V-prism 615, according to one embodiment described herein. FIG. 6 illustrates that reflective SLMs (e.g., a reflective mask SLM 620) can be used in other arrangements other than with an x-cube prism 430 as shown in FIG. 5. FIG. 6 includes the V-prism 615 which does not have a visible seam that may be visible by the user when using an x-cube prism. As shown, the AR system 600 uses polarizers 605 and 675 and a field lens 625 to occlude a portion of the image and add an AR character into the occluded portion. Specifically, light enters from the environment through the polarizer 605 and an objective lens 610 as illustrated by the solid lines forming actual rays 685. A first mirror 660 (or a total internal reflecting surface formed from a solid v-prism block rather than a free-space mirror version) in the V-prism 615 reflects the light to a right-side mirror 635 which in turn reflects the light to the field lens 625. The light can pass through a quarter-wave plate 630 which is optional depending on the type of the reflective mask SLM 620.

As discussed above, the reflective mask SLM 620 occludes a portion of the light which can then be backfilled by an image provided by an image SLM 680. After being occluded, the light passes back through the field lens 625 and to a second side mirror 640 which directs the light to a selective pass through (ps) mirror 650. Because the light received from the environment via the objective lens 610 has a different polarization than the light generated by the image SLM 680, the light from the environment is reflected by the psMirror 650 while the light from the image SLM 680 passes through the psMirror 650. That is, after emitting the image using the image SLM 680, a polarizer 675 polarizes the light to have a different polarization than the light passing through the polarizer 605. Thus, when the light reflects off of a mirror 670 and a mirror 655 in the V-prism 615, it passes through the psMirror 650 and back fills the occluded portion of the light or image received from the environment through the objective lens 610. As shown by the dotted idealized rays 665, the AR system 600 is perspective correct.

As shown, the reflective mask SLM 620 faces a first side of the v-prism 615 (e.g., the bottom side) while the objective lens 610 faces a second side of the v-prism 615 and the eyepiece lens 645 faces a third side of the v-prism 615. The first side is perpendicular to the second and third sides.

Figure 7:
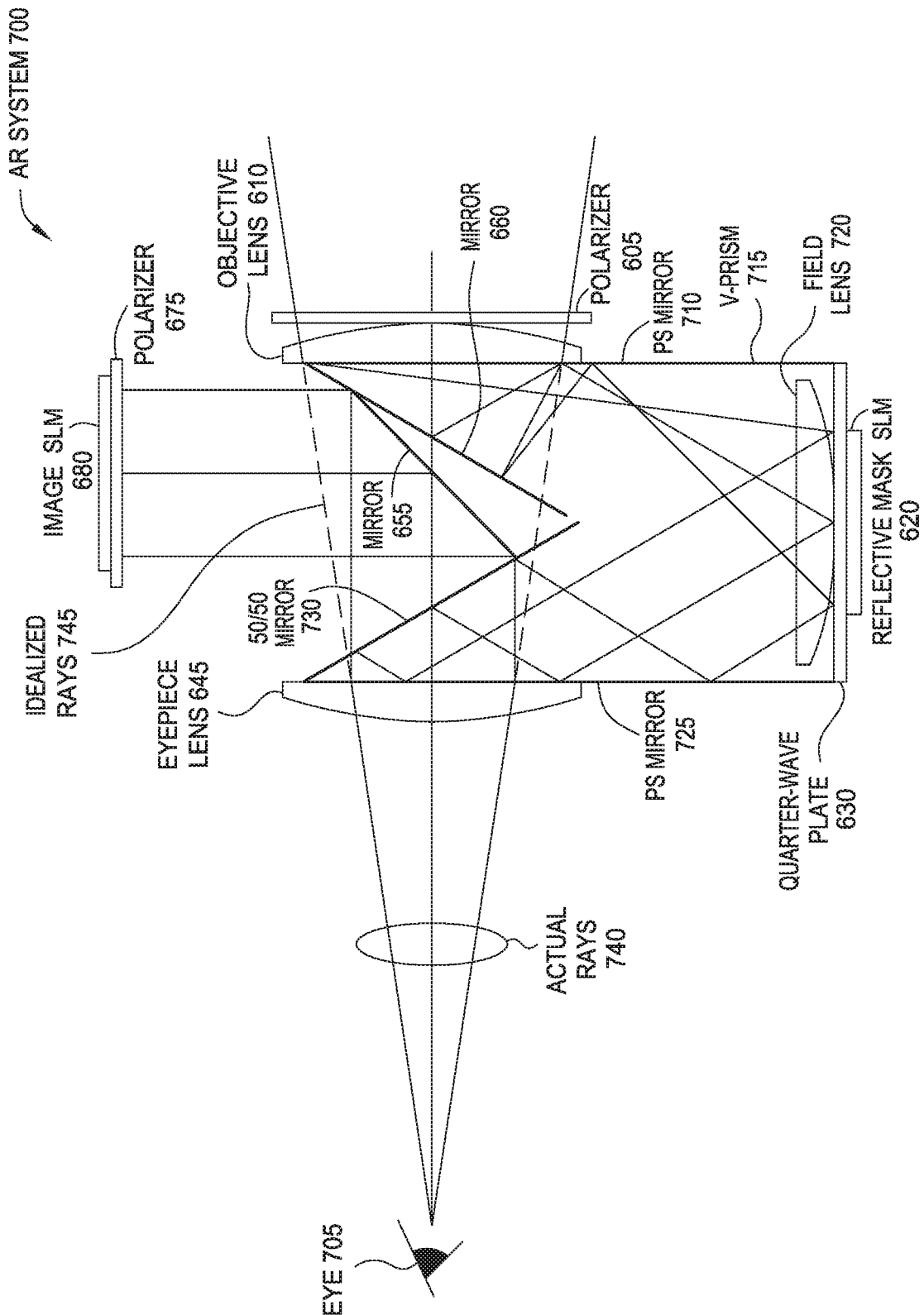
FIG. 7 is a perspective correct AR system with V-prism, according to one embodiment described herein.

FIG. 7 is a perspective correct AR system with V-prism, according to one embodiment described herein. Different arrangements of the eyepiece and objective lenses and the V-prism provide a trade-off field of view and image brightness. In FIG. 6, the light avoids reflecting back into its previous path, resulting in a smaller field of view, but can use a polarization selective mirror to combine the masked and color image for a brighter image. FIG. 7, in contrast, permits a larger field of view; but uses a 50/50 mirror 730 in the V-prism 715 to introduce the color image. Polarization selective mirrors (e.g., psMirrors 725 and 710) and quarter-wave plate 630 allow walls in the V-prism 715 to alternately pass and reflect light (as shown by the actual rays 740), thus reducing the brightness. Nonetheless, the idealized rays 745 illustrate that the AR system 700, like the AR system 600, is perspective correct at an eye 705 of the viewer.

Figure 8:
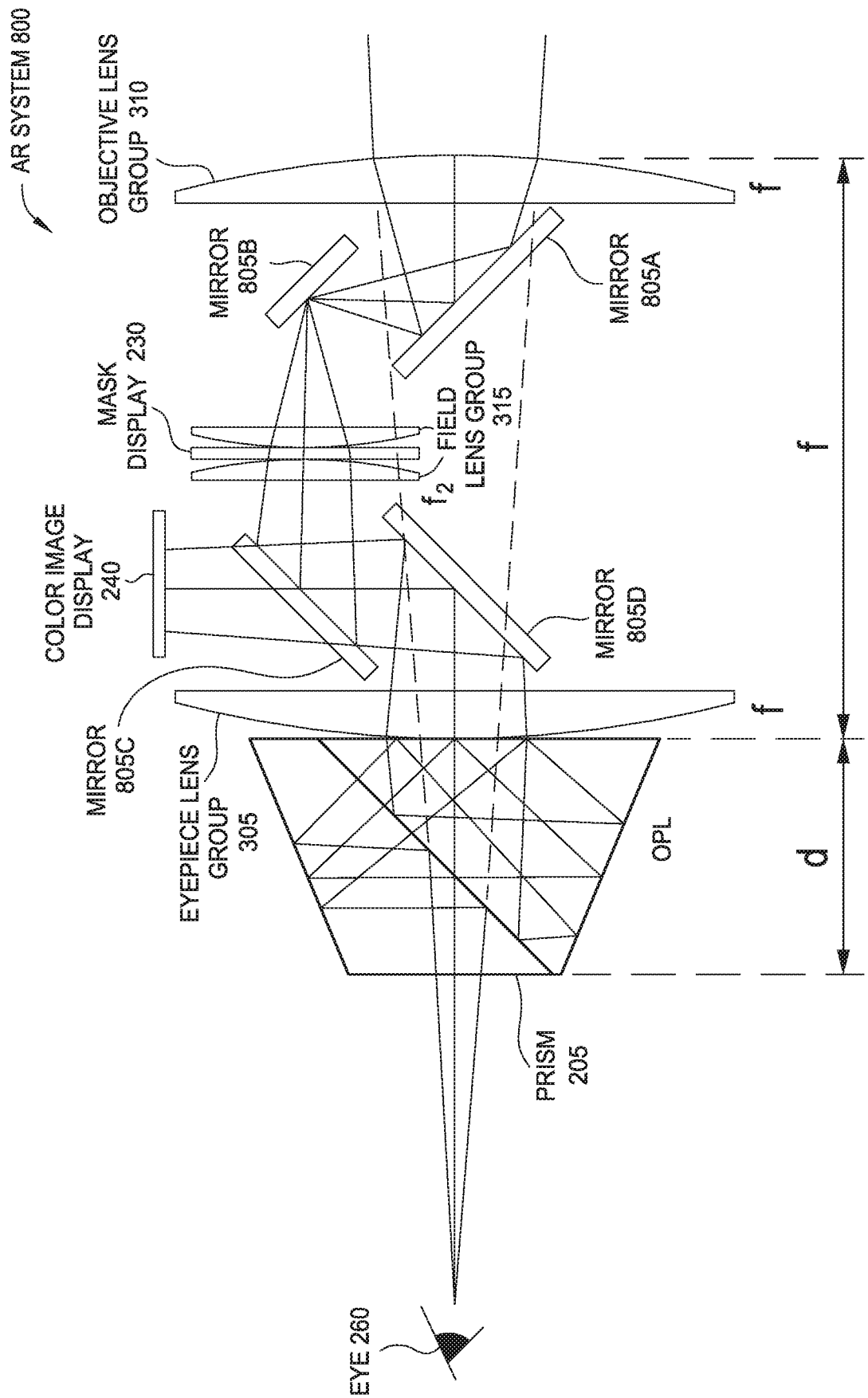
FIG. 8 is a perspective correct folded AR system with a prism, according to one embodiment described herein.

FIG. 8 is a perspective correct folded AR system 800 with the prism 205, according to one embodiment described herein. The AR system 800 contains many of the same components as those in FIG. 3 as illustrated by using the same reference numbers. However, the AR system 800 includes mirrors 805A-D which may enable the AR system 800 to be more compact than the AR system 300 in FIG. 3.

The light received from the rightmost lens (i.e., the objective lens group 310) is reflected by a first mirror 805A up in a direction perpendicular to the horizontal direction in which the light is received from the environment through the objective lens group 310. A second mirror 805B then redirects the light back into the horizontal direction where the light reaches a field lens group 315 which includes a pair of lenses disposed on opposite sides of the mask display 230. The occluded image generated by the mask display 230 is reflected by a third mirror 805C down in the vertical direction. Moreover, the third mirror 805C may be a polarization selective mirror so that the light emitted by color image display 240 (which includes the AR character) can pass through the third mirror 805C while the occluded image from the environment is reflected. The color image display 240 outputs an AR image that replaces the occluded portion of the image provided by the environment. A fourth mirror 805D reflects the light back along the horizontal direction and into the leftmost lens (i.e., the eyepiece lens group 305) and the Pechan-Schmidt prism 205 which flips the image before the image reaches the eye 260.

Because the mirrors 805A and 805C reflect the light up in the vertical direction, this means the AR system 800 uses two directions to transmit the light which can lead to a more compact design, or at least to shift the center of gravity of the AR system 800 closer to the viewer relative to the inline AR system 300 in FIG. 3. Put differently, the AR system 800 uses multiple directions to establish the optical path which can shrink the distance between the eyepiece lens group 305 and the objective lens group 310 relative to the distance between these lenses in FIG. 3.

Figure 9:
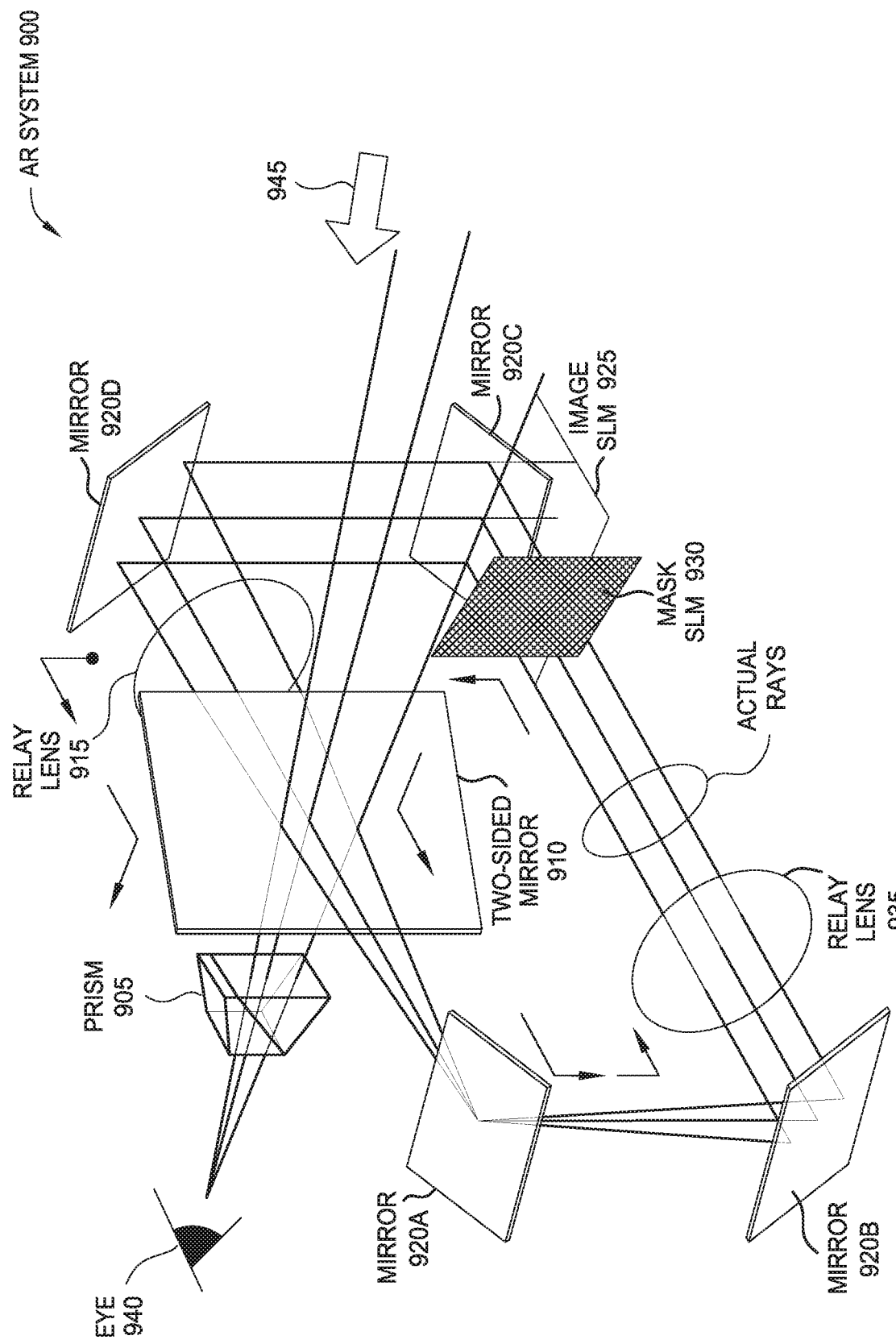
FIG. 9 is a perspective correct looped AR system with a prism, according to one embodiment described herein.

FIG. 9 is a perspective correct looped AR system 900 with a prism 905, according to one embodiment described herein. FIG. 9 illustrates a looped two-lens system that uses the erecting prism 905 and one (two-lens) 4f relay with a looping mirror system to place the relayed real image at the object—e.g., the eye 940. The eyepiece lens (e.g., the relay lens 915) and the mirror can be inline, while the objective lens (i.e., the relay lens 935) can be in the looped path. The locations of the eyepiece and objective lenses can be shifted around the system (keeping the same relative distance between lenses). FIG. 9 shows both lenses in the looped path, but a different layout (but same principle) may have the eyepiece lens in the inline path after the prism, while the objective lens may be in the looped path The optical path begins at arrow 945 where light from the environment enters into the AR system 900 and reflects off a first surface of a two-sided mirror 910 towards a first mirror 920A. The first mirror 920A reflects the light to a second mirror 920B which in turn reflects the light to a first relay lens 935 which, in one embodiment, collimates the light. In one embodiment, the first relay lens 935 is an objective lens.

The collimated light passes through a mask SLM 930 which occludes a portion of the image represented by the light received from the environment. The occluded image is then reflected by a third mirror 920C which may be a polarization selective mirror so that the light received from the mask SLM 930 is reflected but the light generated by an image SLM passes through the mirror 920C to combine with the light from the environment. In this manner, the image generated by the image SLM 925 can be inserted into the occluded portion of the image generated by the mask SLM 930.

The light is then reflected by the mirror 920D and passes through a second relay lens 915 (e.g., an eyepiece lens) which focuses the collimated light as the light reflects off a second surface of the two-sided mirror 910, passes through a prism 905, and finally reaches the eye 940. The prism 905 can be a Pechan-Schmidt prism or a Dove-Harting prism array.

FIG. 9 illustrates a perspective-correct AR display that uses two-lenses (e.g., relay lens 935 and relay lens 915) and the prism 905 to create a looped path. Because the loop is perpendicular to the direction the user is facing, this AR display may have its center mass closer to the user which can improve wearability. Use of prisms to erect the image removes a relay set resulting in a compact system.

Figure 10:
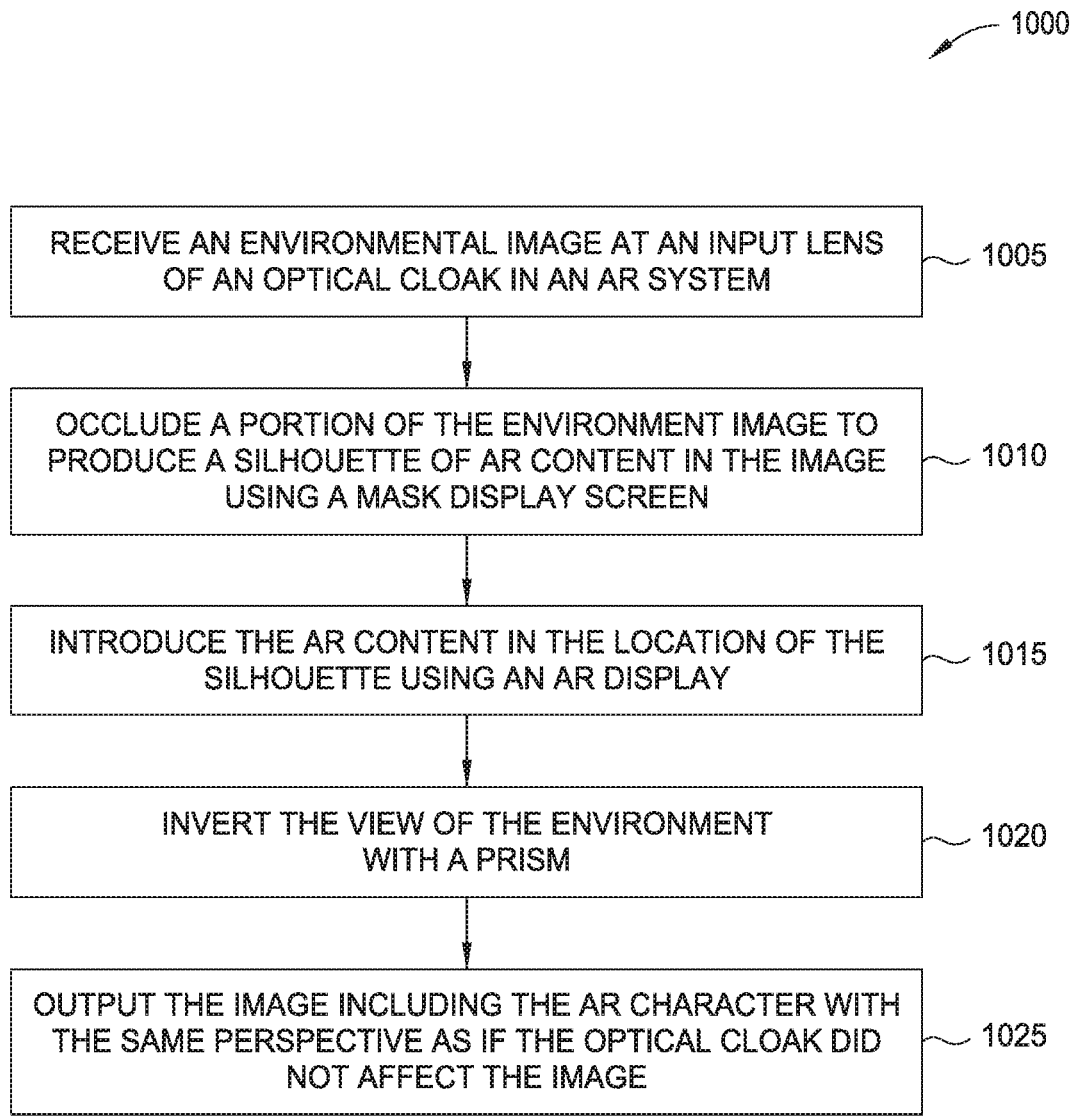
FIG. 10 is a flow chart for providing occluded AR content using a folded optical cloak, according to one embodiment described herein.

FIG. 10 is a flow chart of a method 1000 for providing occluded AR content using a folded optical cloak, according to one embodiment described herein. Method 1000 begins at block 1005 where the optical cloak receives an environmental image at an input lens. In one embodiment, the optical cloak is integrated into a headset of an AR system (or two optical cloaks if stereoscopic views are desired). As the user moves her head, the input lens of the optical receives light corresponding to different environmental images. Furthermore, the AR system may include an object tracking system for identifying objects in the environment and determining the distance from these objects to the user.

At block 1010, the optical cloak occludes a portion of the environmental image to produce a silhouette of AR content in the image using a mask display screen. In one embodiment, the mask display screen is a transparent LCD panel (without a backlight), electrowetting display, electrochromic display, SLM, and the like. Moreover, the display may be a transparent or a reflective display (e.g., a reflective SLM). While most of the light of the environmental image is permitted to pass through the mask display screen unabated (if the display is a transparent display), the optical cloak controls a portion of the screen to block or occlude some of the light thereby created a black silhouette in the environmental image. In one embodiment, the black silhouette matches an outline or boundary of the AR content that is introduced later into the image.

At block 1015, the optical cloak introduces the AR content in the location of the silhouette using an AR display screen. In one embodiment, the optical cloak introduces the AR content using non-transparent display screen such as a backlit LCD screen. For example, using a beam combiner, the optical cloak merges the light emitted by the LCD screen with the received light. Alternatively, the AR display screen can be an OLED screen where only the portion of the screen corresponding to the AR content emits light while the remaining portion of the OLED screen is transparent. As the light passes through the OLED screen, the AR content is added to the environmental image in order to integrate the AR content into the environment. In another embodiment, the image generated the AR display screen is combined with the occluded view of the environment at, for example, a beam combiner. Moreover, the optical cloak can include logic that synchronizes the locations of the black silhouette and the AR content in the mask and AR display screens so that the AR content overlaps the black silhouette in the image provided to the user.

At block 1020, the optical cloak inverts the view of the environment using an erecting prism. For example, when the light passes through an objective lens and eyepiece lens, the view of the environment is flipped. Rather than using a second pair of lenses, a prism can be disposed between the objective and eyepiece lenses or between the eyepiece lens and the eye of the user to flip the view back to its original orientation.

At block 1025, the optical cloak outputs an image that includes the AR content with the same perspective as if the optical cloak did not affect the image. Put differently, the light rays forming the image exits the optical cloak along the same direction and location as if the light rays had passed through free space. As such, the user's perspective of the environment is the same as if the user was not viewing the environment through the optical cloak.

While the foregoing is directed to embodiments of the present invention, other and further embodiments of the invention may be devised without departing from the basic scope thereof, and the scope thereof is determined by the claims that follow.

What is claimed is:

1. An augmented reality (AR) system, comprising:
   a first focusing element configured to receive light defining a view of a user environment;
   a mask display screen configured to occlude a selected portion of the view;
   an AR display screen configured to generate AR content that appears in the view at a location of the occluded selected portion;
   a prism, wherein the light passes through the prism; and
   a second focusing element configured to emit the view containing the AR content to a user, wherein an optical path length of the prism and a spacing between the first and second focusing elements is set such that when the received light defining the view exits the AR system, the exiting light propagates in respective first directions that are the same as respective second directions of the received light entering the AR system such that the AR system is perspective correct,
   wherein the light from the user environment passes through both the first and second focusing elements before reaching the prism.

2. The AR system of claim 1, wherein the optical path length of the prism and the spacing between the first and second focusing elements maintains, at least in part, a perspective of the user at a location of an eye of the user viewing the view provided by the AR system.

3. The AR system of claim 1, wherein the optical path length of the prism and the spacing between the first and second focusing elements is set such that, to a perspective of the user, the first and second focusing elements do not redirect the received light from the first directions as the received light travels through the AR system.

4. The AR system of claim 1, wherein the prism is an erecting prism.

5. The AR system of claim 4, wherein the prism comprises one of a Pechan-Schmidt prism and a Dove-Harting prism array.

6. The AR system of claim 4, wherein the light passes through the mask display screen, wherein the mask display screen is disposed between the first and second focusing elements.

7. The AR system of claim 6, further comprising:
   a field lens group comprising a first lens and a second lens, wherein the first lens is disposed between the first focusing element and the mask display screen and the second lens is disposed between the second focusing element and the mask display screen.

8. An AR system, comprising:
   a first focusing element configured to receive light defining a view of a user environment;
   a mask display screen configured to occlude a selected portion of the view;
   an AR display screen configured to generate AR content that appears in the view at a location of the occluded selected portion;
   a prism, wherein the light passes through the prism;
   a second focusing element configured to emit the view containing the AR content to a user, wherein an optical path length of the prism and a spacing between the first and second focusing elements is set such that, to a perspective of the user, the first and second focusing elements and the prism do not redirect the light received from the user environment as the light travels through the AR system; and
   a field lens group collocated at focal planes of the first and second focusing elements.

9. The AR system of claim 8, wherein the optical path length of the prism and the spacing between the first and second focusing elements maintains, at least in part, the perspective of the user at a location of an eye of the user viewing the view provided by the AR system.

10. The AR system of claim 8, wherein the light from the user environment passes through the both the first and second focusing elements before reaching the prism.

11. The AR system of claim 8, wherein the prism is disposed between the first and second focusing element such that the light from the user environment passes through the first focusing element and the prism before reaching the second focusing element.

12. The AR system of claim 11, wherein the prism comprises one of a polarization selective block prism or a V-prism.

13. The AR system of claim 12, wherein the mask display screen comprises a reflective spatial light modulator (SLM).

14. The AR system of claim 13, wherein the reflective SLM faces a first side of the prism that is perpendicular to a second side of the prism facing the first focusing element and to a third side of the prism facing the second focusing element.

15. A method, comprising:
    receiving light defining a view of a user environment at a first focusing element in an AR system;
    passing the light received at the first focusing element through a prism;
    occluding a selected portion of the view to produce a silhouette of AR content in the view;
    introducing the AR content into the view at a location of the silhouette; and
    outputting the view containing the AR content at a second focusing element, wherein an optical path length of the prism and a spacing between the first and second focusing elements is set such that when the light defining the view exits the AR system, the exiting light propagates in respective first directions that are the same as respective second directions of the light when entering the AR system,
    wherein the light from the user environment passes through both the first and second focusing elements before reaching the prism.

16. The method of claim 15, wherein the optical path length of the prism and the spacing between the first and second focusing elements maintains, at least in part, a perspective of a user at a location of an eye of the user viewing the view provided by the AR system.

\* \* \* \* \*